Sept. 23, 1930. G. M. DITTO 1,776,751
SEEDER AND THE LIKE
Filed Dec. 5, 1928
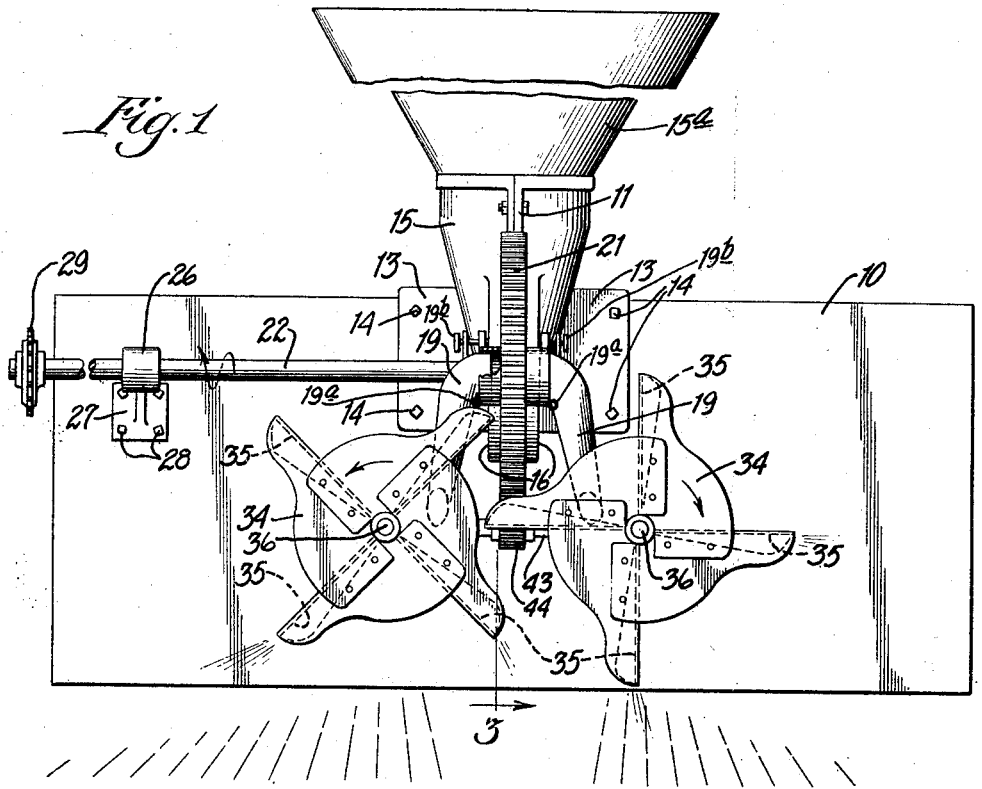
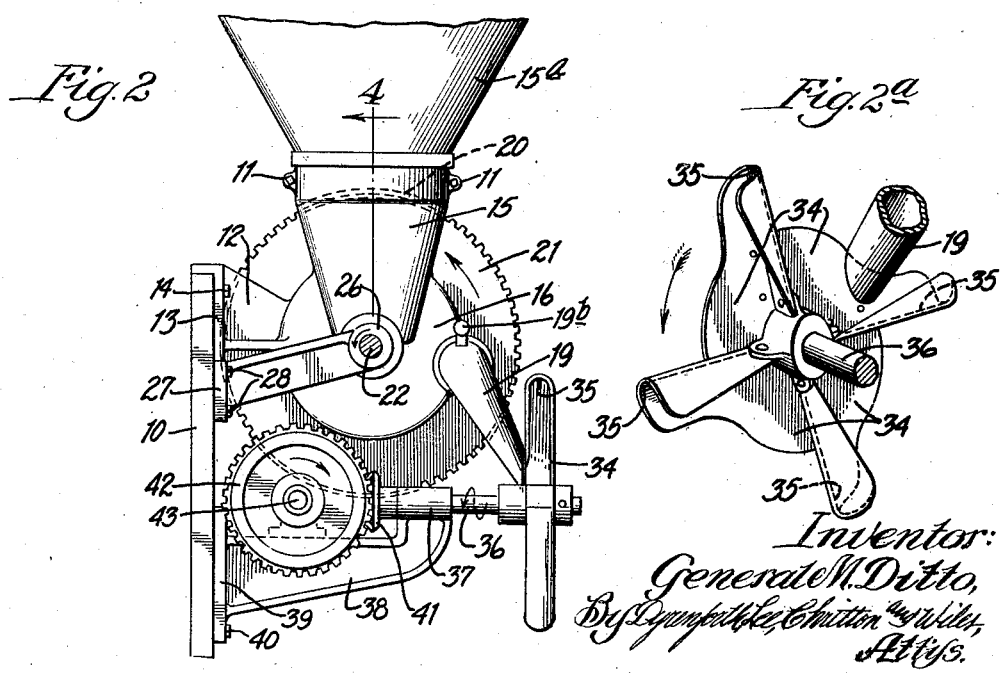

Patented Sept. 23, 1930

1,776,751

UNITED STATES PATENT OFFICE

GENERAL M. DITTO, OF JOLIET, ILLINOIS

SEEDER AND THE LIKE

Application filed December 5, 1928. Serial No. 324,033.

This invention relates to broadcasting machines, such as may be used for broadcasting grain, seed, fertilizer, etc.

An important feature of my invention is the provision of means for confining the seed, for example, and broadcasting it directly towards the earth, or in a plane which sharply intersects the earth. The purpose is to throw the material forcibly towards the earth in such manner as to prevent it from being blown or shifted by the wind. Thus, greater uniformity of distribution is insured and the danger of leaving barren areas is obviated.

Other features and advantages of my invention will appear more fully as I proceed with my specification.

In that form of device embodying the features of my invention shown in the accompanying drawing, Figure 1 is a view in rear elevation of the seeder, showing the same attached to the rear end of the wagon, the view being taken looking in the direction of travel of the wagon; Fig. 2 is a view in side elevation; and Fig. 2ª is a view in perspective of the rotary distributor from the rear.

As shown in the drawings, 10 may indicate the tail gate or tail board at the rear end of a wagon, to which my improved seeder is here shown attached. The view of Fig. 1 is taken looking in the direction of travel of the wagon.

The seeder includes two complemental cast members, as shown in Figs. 1 and 2, adapted to be fastened together by means of bolts through the ears 11. Each of these members includes a supporting bracket 12 projecting from the plate 13 adapted for attachment to the tail gate of the wagon by bolts or lag screws 14.

Each of the cast members, as shown in Fig. 1, includes a hopper 15, and 15ª indicates an extension and hopper that may be placed on top of the two members when they are fastened together to supply the hopper 15 in each of such members. Each cast member also includes a circular feeding chamber 16.

A gear wheel 21 is mounted on a shaft 22 extending through the holes or bearings in the cast members. The gear wheel 21 is provided on each side with radial, convexly curved blades not shown, the blades on each side lying in one of the circular feeding chambers 16. In the operation of the device, rotation of the gear wheel 21 is imparted in the direction indicated by the arrow in Fig. 2 so that material, for example, the seeds, flowing through an outlet from the hopper 15 into the feeding chamber 16, are caught by the blades, carried around, and discharged into the spout 19.

The shaft 22 has its outer end supported by a bearing 26 carried by the plate 27 attached to the tail board 10 by means of the lag screws or bolts 28. Said shaft may be driven in any suitable manner. For example, it may be provided with a sprocket 29 driven by a chain (not shown) from a sprocket (not shown) on the wheel (not shown) of the wagon, in the same manner that the device of my prior patent is driven.

Arranged adjacent the lower end of each spout 19 is a rotary distributor, or broadcaster, 34 provided with radially arranged portions 35. Since the construction and operation of the two distributors are the same, I shall describe in detail but one. Seed or other material issuing from the spout 19 falls in the troughs 35 of the rotary distributors which are driven in a direction indicated by the arrows shown in Fig. 1. Such rotation of the distributors serves to throw or cast the material from the troughs 35 downwardly, as indicated by the dotted lines in Fig. 1. There is thus effected a rather uniform and even distribution of seed or other material in a plane crosswise of the direction of travel of the wagon to which the seeder is attached.

Each of the rotary distributors 34 is carried on a shaft 36 supported in a bearing 37 carried by a bracket 38 attached to a plate 39, which is fastened to the tail board 10 of the wagon by means of the bolts or lag screws 40. The inner end of each shaft 36 is equipped with a bevel gear 41. The bevel gears 41 are driven by the bevel gears 42 carried by the shaft 43 which, in turn, is driven by a pinion 44 meshing with the gear wheel 21.

It is to be noted that the rotary distributor 34 with the troughs or passages 35 is adapted to confine the seed or other material against general broadcasting and direct it in a plane towards the earth. The spout 19 which feeds seeds or other material to the channels 35 operates to supply said seed or other material to said channels for broadcasting through a sector of the plane of distribution of the seed adjacent the earth. It is to be noted also that the rotary distributor 34 preferably rotates in a plane which intersects the earth at substantially a right angle and that said distributor is provided with channels which extend outwardly from the center and present open sides to the earth while passing through a lower sector of the plane of rotation. Each of the spouts 19 operates to serve seed or other material to the channels 35 as they leave a phase of a lower sector of the plane.

Preferably, the spouts 19 are capable of being adjusted somewhat for the purpose of effecting delivery of the material to the channels 35 at a greater or lesser distance from the center of rotation of the broadcaster 34. For example, looking at Fig. 1, the free end of the spout may be moved towards or away from the axis 36 for the purpose of timing the delivery of the seed into the channels so that while the channel is being carried through the upper half of the circle, the material will, by centrifugal force, be moved towards the outer end of the channel and will be discharged at the end of the channel while the channel is passing through approximately the lower half of the circle described. The spouts 19 are shown pivoted at 19ª and adjustable by means of set-screws 19ᵇ.

Inasmuch as the broadcasting from each channel occurs from the outer end portion of the channel, obviously it is not an absolute essential that the channel should have an open side, at least through the outer portion of its length. The channel acts essentially like a tube open at its outer end, so far as the broadcasting action is concerned.

In practice, the base portions of the spouts 19 may be fitted into the sockets at the holes 18 in such manner as to permit the adjustment noted above, or any other suitable means for permitting adjustment may be employed. If desired, the spouts 19 may be sufficiently flexible to enable them to be bent somewhat until properly adjusted with relation to the axis of the broadcaster.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. In a broadcasting machine, a rotary member provided with passages adapted to confine the seed against general broadcasting and direct it in a plane towards the earth, and means for feeding seed to the inner end portions of said passages.

2. In a broadcasting machine, a rotary member provided with channels adapted to confine the seed against general broadcasting and direct it in a plane towards the earth, and means for feeding seed to said channels, said means operative to supply seed to said channels for broadcasting through a sector of said plane adjacent the earth.

3. In a broadcasting machine, a rotary member having an approximately horizontal axis and provided with seed-confining channels generally parallel with a plane at right angles to said axis, and seed-feeding means operative to supply seed to said channels in such manner as to cause it to be broadcasted directly towards the earth through a lower sector of said plane.

4. In a broadcasting machine, a broadcasting member rotating in a plane which intersects the earth at about a right angle and which is provided with channels which extend outwardly from the center and present open sides to the earth while passing through a lower sector of the plane of rotation, and seed-feeding means operative to serve seed to said channels as they leave a phase of a lower sector of the plane.

5. In a broadcasting machine, a rotary member having an axis extending in the general direction of travel of the machine and rotating in a plane which sharply intersects the earth, said member having channels provided with walls adapted to confine the material being broadcasted close to the plane in which the member rotates, and means for actuating said rotary member.

6. In a broadcasting machine, a rotary broadcasting member having an axis extending in the general direction of travel of the machine and having channels with open ends rotating in a plane substantially at right angles to said axis, and a device for feeding material to said channels, said device having means for varying with relation to said axis the point at which the material is delivered to the channels.

7. In a broadcasting machine, a pair of broadcasting rotary members having axes extending in the general direction of travel of the machine and having laterally directed channels adapted to confine the materials against general broadcasting, and means for rotating said members in opposite directions.

8. In means of the character set forth: a vehicle; and a seeder mounted thereon comprising a rotary member having an axis longitudinal of the vehicle and provided with transverse channels adapted to confine the material to a transverse plane and cast it wholly through a sector intersecting the earth, means for driving said rotary member, and means for supplying material to said transverse channels.

9. In a broadcasting machine; a pair of rotary broadcasting members having axes extending in the general direction of travel of the machine, said members having channels to confine the material close to the plane of rotation, a pair of spouts for feeding material to said channels so as to broadcast it from the lower sector of said plane, and means for rotating said members in opposite directions.

In testimony whereof, I have hereunto set my hand this 28th day of November, 1928.

GENERAL M. DITTO.